coupled to said data source for separating and feeding the successive digits of the information to be transmitted in blocks into the four channels so that odd digits are fed into one or other of one pair of channels according as the digit is to be a '0' or '1' and even digits are fed into one or other of the other pair of channels according as to whether that digit is a '0' or '1,' each block having a constant number of bits, means for transmitting, between the end of one block of bits and the beginning of the next block, signals on two channels of either the first pair or the second pair to form an interblock indicator, the particular pair of channels used for the indicator being a pair not including the channel used for the last bit of the preceding block and the next succeeding block starting with a bit on one or other of a pair of channels not the same as that used for the indicator immediately preceding this bit, alternate interblock indicators being different, in combination with a receiver for receiving and reporting the information transmitted on said four channels, first and second registers for staticizing blocks of received information, a plurality of output lines, first and second interblock detectors providing output signals responsive respectively to the two different interblock indicators, gate means responsive to the output signal from said first interblock detector feeding signals from said first register to said output lines and gate means responsive to the output signal from said second interblock detector feeding signals from said second register to said output lines.

15. A transmission system as claimed in claim 14 wherein there are provided first resetting means responsive to the output signal from the first detector which first resetting means reset said second register to zero and second resetting means responsive to the output signal from the second detector, which second resetting means reset said first register to zero.

16. A transmission system as claimed in claim 14 wherein each interblock detector includes error checking logic providing an error signal and inhibiting said output signal if, after the appropriate register is filled, any signal is received before the completion of the two bits of the appropriate interblock indicator.

17. A transmission system for transmission, from a transmitting station to a receiving station, of binary digital data in serial form, said data comprising successive characters, each character being of a predetermined constant number of bits wherein means are provided at said transmitting station for transmitting interblock indicators after each character, said interblock indicators being alternately of different distinctive form, comprising at least two binary bits, and wherein, at the receiving station, there are provided means for receiving the transmitted data, two registers for staticizing alternately received characters, a set of output lines, and two interblock indicator detectors responsive respectively to the two distinctive interblock indicators, and providing output signals, and two set of gate means coupling said two registers respectively to said output lines, said gate means being responsive to the output signals of the respective interblock indicator detectors to be opened only by the appropriate interblock indicator.

* * * * *

DATA COMMUNICATION SYSTEM AND TECHNIQUE OF TAGING DATA OF DIFFERENT CLASSES

This invention relates to electrical communication systems. More particularly, this invention relates to digital systems wherein a single communication channel serves to transmit coded signals of different classes, for example, signals derived from different sources, or signals relating to different categories of information.

By means of this invention, it is possible to use a single communication channel simultaneously for multiple services requiring various reaction times for each class of service. Greater through-put of data may be achieved by allocation of character transmission rates for each class of service, and by readjustments of these allocations, e.g. within very short time periods such as milliseconds, whenever the load requirements for any service changes. The flexibility provided by the present invention may particularly be contrasted with the relative rigidity of the familiar fixed time-slot multiplexing used in some systems.

It is well known that during the recent past there has been considerable growth in number and capacity of data-processing systems requiring the transmission of large amounts of information between separate stations. Primarily, these systems have been directed toward solving specialized business problems. For example, sophisticated seat reservation systems have been created for the commercial airlines to permit their ticket agents throughout the country to determine almost instantly how many unreserved seats are available on any particular flight, and to update the inventory records when seat sales are made.

Similarly, quick-acting "query-and-reply" systems have been invented to permit stockbrokers, including those located in distant branch offices, to interrogate a central data bank for the purpose of determining current stock prices and related data, merely by pressing selected buttons on a small desk set. Still other systems have been devised to enable business agents to process orders, to obtain detailed information such as research reports on selected financial securities, to check inventories, to handle deposits and withdrawals in savings banks, and so forth. The number and varieties of such specialized systems have steadily increased, and it is clear that this growth will continue.

These specialized data-processing systems typically require extensive and expensive facilities for communicating over relatively long distances, e.g. from an airline ticket agent in one city to a central reservation data bank in another city. Generally speaking, such processing systems all use the same basic communications technology, i.e., the information is carried by digitally coded characters sent over conventional transmission lines, either privately owned or leased from a common carrier. However, ordinarily each system has been provided with its own independent communication network.

Although it may be clear on a theoretical level that considerable improvement in overall efficiency might be achieved by employing a single integrated communication network for handling all of the traffic of a number of different specialized data processing systems, as a practical matter this has not come about, nor does there appear to be a trend in that direction. To the contrary, each new system ordinarily has evolved with communication requirements different from preceding systems, or at least not readily handled by existing equipment, and therefore each system typically is designed with its own unique communication facilities. As a consequence, the communication facilities for specialized data-processing systems frequently have differed from one another in employing different character codes and code structures, and also in operating at significantly different data rates.

The problem of efficiently integrating such communication facilities to permit one channel to handle transmission of two or more classes poses severe difficulties. In particular, differences in code structures and data rates present impressive technical barriers to effecting any real integration of multiple communication networks. The development of standard codes, such as ASCII, the USA Standard Code for Information Interchange, may tend in the future to reduce the number of codes that must be handled by a common communications channel; however, the standardization effort will not reduce the need for handling the coded signals of different classes at different rates in application presenting varied message types to be transmitted and received, e.g., by different equipment for different data transmission services. Moreover, until a standard code is universally adopted, there will be a serious problem in phasing out multicode systems, since it would be an economic hardship to discontinue the use of hardware employing nonstandard codes.

To summarize: In many existing commercial installations, an extensive overlay of duplicate transmission facilities has been erected to take care of different classes of communications between multiple stations, e.g., a central station and affiliated remote stations. Such transmission facilities are costly, and it can be predicted that if present practices are continued this cost will grow to such an extent as to create a serious problem in the further orderly expansion of business-oriented data-processing systems. Accordingly, it is a principal object of this invention to solve this and related problems by providing methods and apparatus for transmitting with high efficiency on a single communication channel the traffic representing a number of classes of information, such as signals from two or more independent sources producing digital characters of different code structures and at different data rates.

In accordance with one aspect of this invention, the code characters of all classes first are converted to corresponding "-transmission" characters having a predetermined fixed structure adapted to carry more intelligence than any of the original code characters. At least one segment of the controllable intelligence-bearing properties of each transmission character is utilized as an indicator "flag" to identify the signal class from which the basic information code data incorporated in the transmission character was derived. Each transmission character may contain the information from a single corresponding code character, or from a set of code characters belonging to the same class. These coded transmission characters all are sent in an "interleaved" fashion through the single communication channel, the ratio of interleaving being dependent upon the relative data rates of the respective classes of original code characters at any instant.

At the receiving station(s), the indicator flags are detected and utilized to control conventional logic means for sorting out the transmission characters in such a way that all of the original characters of any one class are reassociated with one another, e.g., so as to operate a corresponding terminal unit. By having initially placed each code character in effect in its own "envelope " having an identifiable "marking" to indicate its original class, the characters can readily be returned to their initial grouping and thereafter utilized for any intended purpose. Moreover, efficient use can be made of a single transmission channel by filling in time "gaps" which result from the relatively low-average data rates of one class of characters, with message segments from a different class of characters operating at a higher average data rate.

It will be clear from the above brief discussion that implementation of our invention necessitates an increase of noninformation-bearing bits. The ratio of the number of bits used for information transmission to the number of bits used to identify a given service preferably should be in the range of 4:1 to 1:1. For example, if we assume a character consisting of eight bits of information and use two bits with each character to identify its class, then we can have a maximum of four classes; if eight bits were used for class identification, then a maximum of 256 classes can be identified.

Even though the present invention entails some increase in required number of bits, the probable continuing increase in bit-carrying capacity of modern electronic equipment, with resultant decrease in cost-per-bit, should more than compensate so as to prevent any net rise in overall cost. In this regard, it may be noted that recent developments already have increased the data transmission capability of present-day telephone circuits from 1,200 bits per second to 4,800 bits per second. Moreover, special circuits now can be obtained which are capable of transmission rates of 50,000 bits per second. The work relating to optical transmission channels (see for example Proc. IEEE, Oct. 1966, pg. 1,302, and Electronics, Sept. 16, 1968, pg. 123) apparently will make possible the transmission of data at rates of more than 1,000,000 bits per second.

In general, the history of developments in data communications and in the laboratory would seem to indicate that in the next decade or two there will be an exponential rise in data rates for readily available facilities from common carriers while the cost will rise only linearly. In light of that trend, and considering the flexibility which can be achieved by our invention with only a fractional increase in the total communication terminal-hardware cost to identify each class of data, our invention can make possible a significantly greater overall cost effectiveness in communications system for handling multiple services. Thus it becomes economically attractive to handle many services over a single data transmission path. Such integration not only reduces the need of separate physical facilities for each type of data communication service, but makes it possible efficiently to add or delete services to any given subscriber by switching within a single terminal to any combination of services transmitted over the single channel.

A presently preferred embodiment of the invention, described hereinbelow, illustrates how different classes of communications such as the outputs of two or more data sources can be handled efficiently by a single transmission channel. However, it will be understood that the invention also is applicable to other problems, such as (1) handling different classes of communications from a single source, (2) providing a direct multipriority connection between a number of sources and a single receiver, (3) providing communications between two or more remote stations, e.g. under the control of a central processor which establishes code conversion and priority details, (4) handling messages from various sources to be received by various receiving stations using a common communications channel, and so forth.

Thus, it will be evident that a principal object of the invention is to provide a generalized communication technique which affords improved operating characteristics in complex data-handling systems. Other specific objects, aspects, and advantages of the invention will in part be pointed out in, and in part apparent from, the following description of preferred embodiments of the invention, considered together with the accompanying drawings, in which:

FIGS. 1A–1B, when combined, form a schematic block diagram of a composite data-processing system using communication techniques based on the present invention;

Figure 1A:
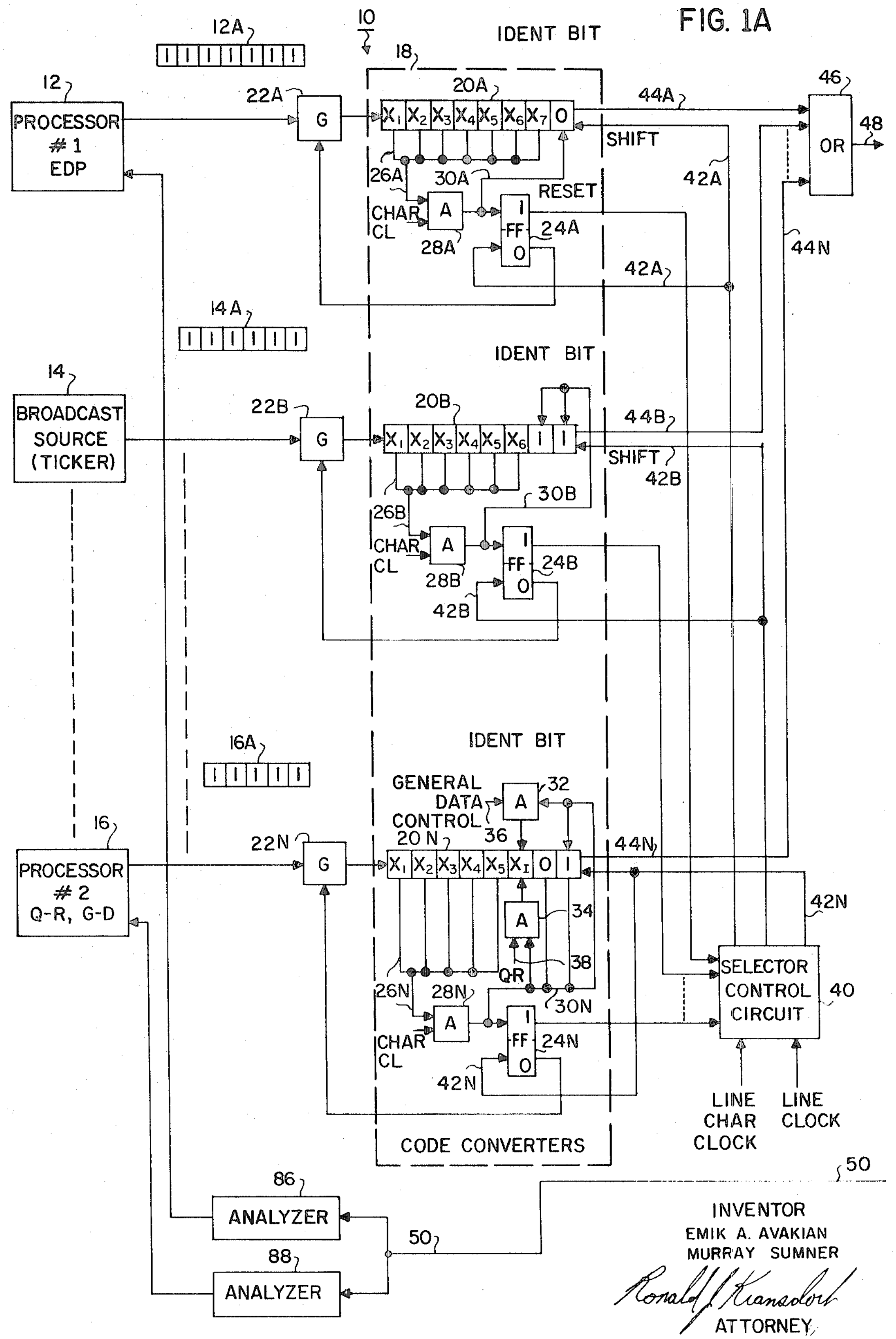

Referring now to FIG. 1A, the disclosed system includes a first station 10 having three independent signal sources represented schematically by blocks 12,14 and 16. Illustratively, this station 10 may be of the type having processing capacity (sometimes referred to as a "central" station) with signal sources indicated to be: (1) a conventional electronic data processor (EDP) suited, e.g., for preparing extensive detailed research reports in response to appropriate inquiry calls, (2) a broadcast unit producing a stream of data respecting a number of similar or related items, such as a stock ticker reporting sales on the New York Stock Exchange, and (3) a specialized query-reply processor for use with remote query stations such as the stockbrokers' desk sets disclosed in copending application Ser. No. 460,117, filed by R. D. Belcher et al., on June 1, 1965.

These three signal sources 12, 14 and 16 may produce digital characters having different code structures, as indicated pictorially at 12A, 14A and 16A, respectively. For example, EDP source 12 may produce seven-bit (ASCII) characters, broadcast source 14 may produce six-bit alphanumeric characters, and query-reply source 16 may produce five-bit characters adapted to control a CRT display in the manner disclosed in the above-identified copending application, Ser. No. 460,117. The relative data rates of the three sources also may differ widely, e.g., the average character rate of EDP source 12 typically may be one-third that of the average query-reply character rate of source 16.

In accordance with one aspect of this invention, the digital code characters produced by the three independent signal sources 12, 14 and 16 are directed to code converters 18. As will be seen shortly, each converter includes logic circuitry for developing, from the original coded characters of different length, a corresponding digital "transmission" character of uniform structure adapted to carry more intelligence than any of the original code characters. For the embodiment of the invention shown in FIG. 1A, each of the transmission characters is made up of eight bits, the first (M) of which are the same as the (M) characters of the input code and the remaining (8–M) of which are identification bits which indicate the source and the class of the information contained in the transmission character.

Coded converters 18 are N more or less identical circuits (where N is equal to the number of input sources 12, 14, 16, etc.) only three of which are shown in the figure. Considering for the moment only the first of these circuits, it includes an eight-bit buffer 20A which is connected as a shift register to receive information from the corresponding data source 12 through gate 22A. Gate 22A is conditioned by the ZERO-side output from a buffer-full flip-flop 24A. Since buffer 20A is to receive a seven-bit ASCII character, seven positions of the buffer are designated to contain these bits. Lines 26A from these bit positions of buffer 20A are dot-ORed together and applied as one input to AND-gate 28A. Therefore, when a bit appears in any one of the seven information bit storage positions of buffer 20A indicating that there is a character in buffer 20A, a signal is applied to one input of AND-gate 28A. This signal, in conjunction with a character clock from processor 12, fully conditions AND-gate 28 to generate an output signal on line 30A. This signal is applied to set buffer-full flip-flop 24A to its ONE state and is also applied to reset the ident bit position in buffer 20A to indicate a binary 0. Referring now to buffer 20B, it is seen that the first six-bit positions of this buffer are designated to store character information with the remaining two-bit positions being used for ident bits. Lines 26B from the six information bit positions are dot-ORed into AND-gate 28B. The output from AND-gate 28B on line 30B, when a character is in buffer 20B, is applied to set the two ident bit positions in buffer 20B to indicate a binary 1.

Similarly, buffer 20N, which is designated to store the five-bit output from processor 16, as five-bit positions allocated for storing information bits and three-bit positions allocated for storing ident bits. As with the other code converter circuits, when a full character is detected in the buffer, a signal appears on line 30N. This signal is applied to set flip-flop 24N, to set the eight bit in the buffer to indicate a binary 1, to set the seventh bit in the buffer to indicate a binary 0, and as one input to AND-gates 32 and 34. Processor 16 is, for this embodiment of the invention, considered to be capable of generating two different classes of code characters. For example, processor 16 may produce not only query-reply characters, but also general data characters intended to serve, in broadcast fashion, to update previous replies so as to reflect changed circumstances, such as a new trading price for a stock previously reported. Processor 16 indicates to which class each output character belongs by generating a signal either on general data control line 36 or on query-reply control line 38. It should be noted that if these are the only two classes of data which the processor generates, then the processor need generate only a signal with, for example, a signal on lie 38 being the inversion of the signal on line 36. If general data is stored in buffer 20N when a signal appears on line 30N, AND-gate 32 will be fully conditioned to set the sixth bit in the buffer, the XI bit, to indicate a binary 1 if a query-reply character is stored in the buffer, AND-gate 34 will be fully conditioned to set the sixth character to indicate a binary 0.

From the above it is seen that each transmission character is made up of eight bits. A transmission character from processor 12 is in the code convention adopted for the illustrative embodiment of the invention, identified by a 0-ident bit in the eighth-bit position of the character. With a 0 in the eighth-bit position of a character; the remaining seven bits will always be information or data bits. A character from source 14 is distinguished from a character from source 12 by a 1 in the eighth-bit position and is further distinguished by a 1 in the seventh-bit position as well. When 1 bits are detected in both the seventh- and the eighth-bit positions, the circuit accepts the remaining six bits of the character as information or data bits. A transmission character from source 16 is distinguished from a transmission character from source 12 by having a 1 in the eighth-bit position and is distinguished from a transmission character from source 14 by having a 0 in the seventh-bit position. When this bit combination is detected in the seventh- and eighth-bit positions of a transmission character, the sixth bit is looked at to determine if the character is general data or query-response data. A 1 in the sixth-bit position indicates general data while 0 in this bit position indicates query-response data. In either event, the remaining five bits of the character are the information or data bits supplied by source 16. If additional data sources are provided, then additional bits will be required for identification purposes. This may be accomplished either by utilizing a longer transmission character or by utilizing data from a source which provides information in a code requiring four bits or less.

The output from the one side of each of the buffer-full flip-flops 24 is connected as an input to selector-control circuit 40. This circuit may, e.g., be a counter which, at each transmission line character clock time, is stepped to generate an output on the line corresponding to the next buffer which has a character to transmit (i.e., corresponding to the next buffer-full flip-flop 24 which is in its ONE state). Once selector-control circuit 40 is set for a given buffer, subsequent line clock pulses are applied through it to the selected output line 42 to shift the character stored in the selected buffer 20 out and through a corresponding line 44 and OR-gate 46 to outgoing line 48 of a duplex transmission line. The first line clock pulse on a line 42 is also applied to reset the corresponding buffer-full flip-flop 24 to its ZERO state.

Figure 1B:
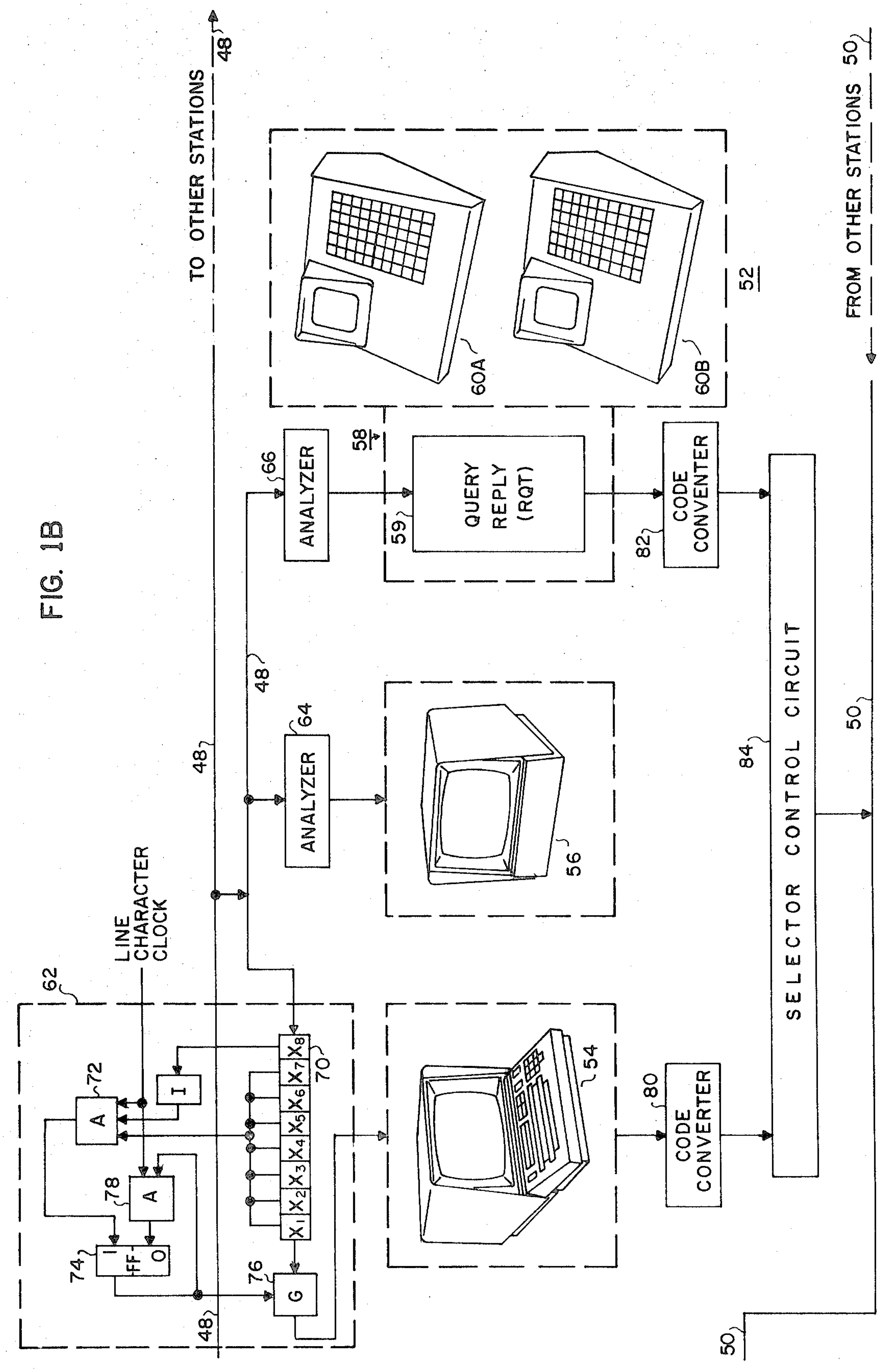

Transmission channel 42 is conventional and may, e.g., comprise, as indicated one-half of a full duplex line, the return channel of which is indicated at 50. Channel 42 directs the coded transmission character to a second station generally indicated at 52 (FIG. 1B). This second station may be of the type sometimes referred to as a "remote" station, in which event the channel 48 generally will be connected to still further remote station (not shown. In many applications, the stations will be coupled to the channel 48 by conventional modulate-demodulate (MODEM) units. Details of such a line coupling arrangement are set forth in the above-identified copending application, Ser. No. 460,117, and therefore will not be repeated here.

All of the transmission characters sent over channel 48 will be presented to all of the receiving stations and examined by equipment at each station to determine whether the characters are intended for any terminal-operating unit of the respective station. In the arrangement shown herein, there are three types of terminal units pictured at station 52: (1) a general purpose input-output unit 54 having a keyboard assembly and a display such as a CRT; (2) a large screen CRT display 56 for presenting broadcast information in multiple line format; and (3) a special purpose unit comprising a query-reply subsystem 58 such as the stock quotation system described in copending application Ser. No. 460,116. The unit 4 is, in the present embodiment, arranged to operate with seven-bit ASCII characters from source 12, the large screen CRT 56 with six-bit characters from source 14, and the stock quotation system 58 with five-bit characters from source 16. Each of these terminal units will include control equipment not shown in detail) for handling incoming message characters as appropriate to the intended function, e.g., the query-reply subsystem 58 typically will include a remote query transceiver (RQT) similar to that described in the above-mentioned copending application Ser. No. 460,117. Such RQT includes a recirculating, sonic delay line memory device arranged to provide multiplexed data acquisition for a number of CRT sets 60A, etc., and to store reply signals to be directed to such desk sets.

Each remote station 52 is provided with code analyzer equipment arranged to examine each received transmission character to determine from which of the sources 12, 14 or 16 it was derived. This analyzer equipment is illustrated in FIG. 1B by separate blocks 62, 64 and 66 for the respective terminal units 54, 56 and 58. The analyzers 62, 64 and 66 are of similar design differing only in the code to which they respond, and could, e.g., be of the type indicated for analyzer 62. This analyzer is designed to detect the seven-bit ASCII characters from EDP source 12. It will be remembered that these characters are distinguished from characters from other sources by the inclusion of a 0-bit in the eighth character position. Analyzer 62 therefore searches for characters having 0 in the eighth bit, and whenever such a character is detected it is directed to the input-output unit 54. This latter unit discards the eighth bit, nd uses the first seven bits for controlling the CRT display. Other types of displays could of course be provided, e.g., a typewriting printer.

In the illustrative embodiment, analyzer 62 is shown as including a buffer 70 the outputs from the first seven positions of which are dot-ORed together and applied as one input to AND-gate 72. The output from the eight-bit position of this buffer is inverted and applied as a second input to AND-gate 72. The final input to AND-gate 72 is a line character clock pulse. Thus, AND-gate 72 will be fully conditioned only when, at a line clock time, there is a character in the first seven positions of buffer 70 and a 0 bit in the eighth position. AND-gate 72 being fully conditioned results in an output signal which is applied to set flip-flop 74 to its ONE state, The output from the ONE side of flip-flop 74 is applied to condition gate 76 to pass the character in buffer 70 to input/output unit 54. At the next line character clock time, AND-gate 78 is fully conditioned to reset flip-flop 74.

Analyzers 64 and 66 would differ from analyzer 62 only in the conditioning inputs to AND-gate 72. For example, analyzer 64 would have the outputs from only the first six positions of buffer 70 dot-ORed into one input of AND-gate 72 with the outputs from the seventh an eighth positions being applied as two additional inputs to this AND-gate. Thus analyzer 64 rejects all characters except those having ones in the seventh- and eighth-bit positions. When such characters are detected, they are selected and serve in the usual fashion to control the CRT display.

Analyzer 66 rejects all characters except those having 0 and 1 in the seventh and eighth bits, respectively. The nonrejected characters are sent on to the RQT unit 59 for storage and utilization as control signals for the CRT display at one of the desk sets 60. The control equipment at the RQT may include conventional means for sensing the sixth-bit of each accepted character, to determine whether the character is part of a reply message to a previous query or is part of a general data broadcast. This control equipment will also activate logic circuitry to utilize the first five bits of each character for whichever intended purpose is indicated by the sixth bit.

Certain types of terminal-operating units at one station may require facilities for transmitting messages to the other station. For example, the query-reply units 60 (and also the input-output units 54) will transmit query messages requesting particular information from a centralized data bank. Such query messages may be sent in response to a "poll" from a central station, or there may be other means of controlling the transmission of messages from various stations to the central station, such as described below. The system need not have a prescribed central station, but may be arranged to send messages arbitrarily from one station "x" to any other station "y."

In any event, the messages sent from the second station 52 to the first (central) station 10 may be handled using the same novel communication techniques described hereinabove for the outgoing message characters. That is, each message character, be it five-, six- or seven-bit format, first is converted to an eight-bit transmission character, as by means of code converters 80 and 82. These transmission characters are directed to a selector control circuit 84 which performs logical operations incident to placing the characters on the return line 50. If only station 52 is sending signals to station 10, the selection control circuit 84 can be a simple circuit similar to selector circuit 40. On the other hand, if there are other stations coupled to line 50 sending signals to station 10, or to other stations, then additional means will be provided for controlling transfer of message signals to the common return line. Various arrangements can be used for this purpose, depending on the nature of the terminal units involved, and the overall system requirements. The specific arrangements for controlling such transfer form no part of the present invention, and therefore only a brief discussion of such arrangements will be presented hereinbelow. arrangements will be presented hereinbelow.

In any complex transmission system carrying data from a number of stations through a common circuit, there must of course be a procedure for regimenting the data such that the stations do not interfere with one another. There have been a number of different arrangements used for this purpose. One common technique involves the use of "polling," whereby a central station sends out on the common-line-polling signals, individual to each station in some present sequence. All potential transmitter stations monitor the line and when one detects its own poll code, it commences sending one or a series of messages when such is available for transmission.

A second technique, sometimes referred to as "pass the bucket" in communications terminology, provides that each transmitter station, after it has completed its message, will send a special code signal activating the next transmitting station in the sequence. If that next station has no message, it will simply transmit the special code signal for the next station, and so forth. Such systems are vulnerable to malfunction of a station in the sequence. To overcome this, one station can be programmed to detect a long quiescent period on the channel. When such a period is detected, that one station will restart the cycle of passing control codes.

In any event, and reverting to FIG. 1B, the return line 50 directs all of the transmission characters coupled thereto to the first station 10 (FIG. 1A) where analyzers 86 ad 88 examine the indicator-bit positions of each character to determine whether the character contains message data intended for processor 12 or processor 16, i.e., characters originated by terminal unit 54 or terminal unit 58. When such characters are detected, the corresponding analyzer directs the message data bits information bits) to the respective processor which carries out the required data manipulations for producing a reply in the form of another set of code characters 12A or 16A. These code characters are converted to corresponding transmission characters and sent on to the querying terminal unit as described hereinabove.

In some communication systems utilizing the present invention, it may be desirable to transmit periodic "synch" characters to maintain the transmitter and receiver units in synchronization. For example, two consecutive ASCII synch characters can be sent over the line every minute or so. In such applications of the present invention, it may be advantageous to define a multicharacter word of fixed format, with the synch characters placed in predetermined successive character positions of the word. Such an arrangement provides for establishing both a "character clock" a "word clock."

Figures 3, 4:
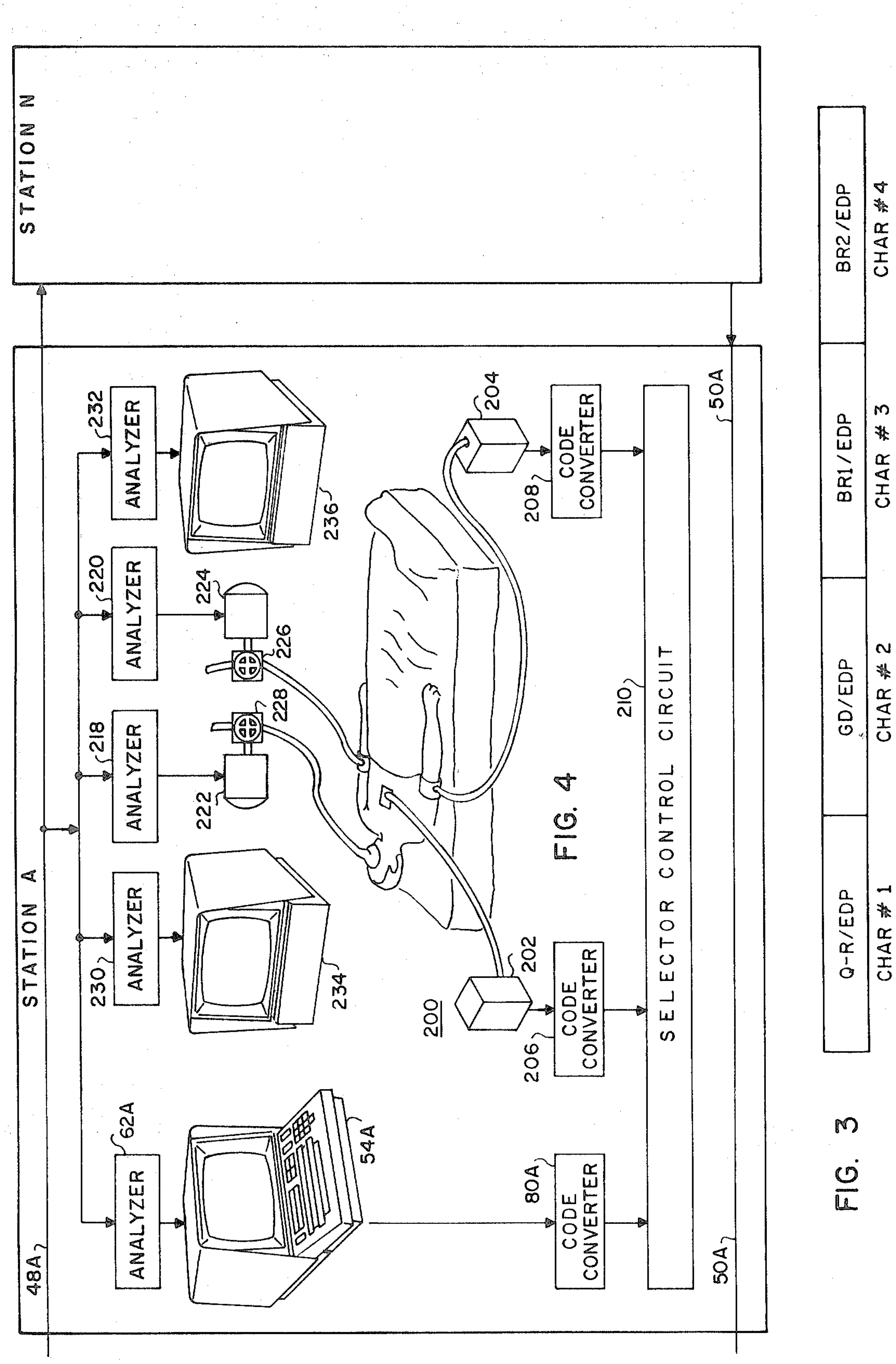
FIG. 3 shows a multiple character word arrangement suited for use with the present invention.
FIG. 4 is a block diagram of a system wherein data is transmitted from a group of sensors to a group of actuators.

The multiple-character word may, e.g., be a four-character arrangement such as is shown pictorially in FIG. 3. There need not be any restrictions on the usage of the different character positions, except for the placement of the synch characters, which may, e.g., always be placed in the third and fourth positions. On the other hand, there may be an advantage, in some complex commercial systems, of assigning certain character positions to corresponding classes of traffic flowing through the line.

As one illustration of such character position assignment, FIG. 3 shows a word structure wherein message transmission characters from processor 16, identified as "query-reply" (Q–R) and "general data" (G–D), are placed in the first and second character positions of the word, whenever such characters are available for transmission. If there are no Q–R or G–D characters awaiting transmission at those character times, the first and second slots are filled with any waiting ASCII-coded EDP characters from the processor 12.

Figure 2:
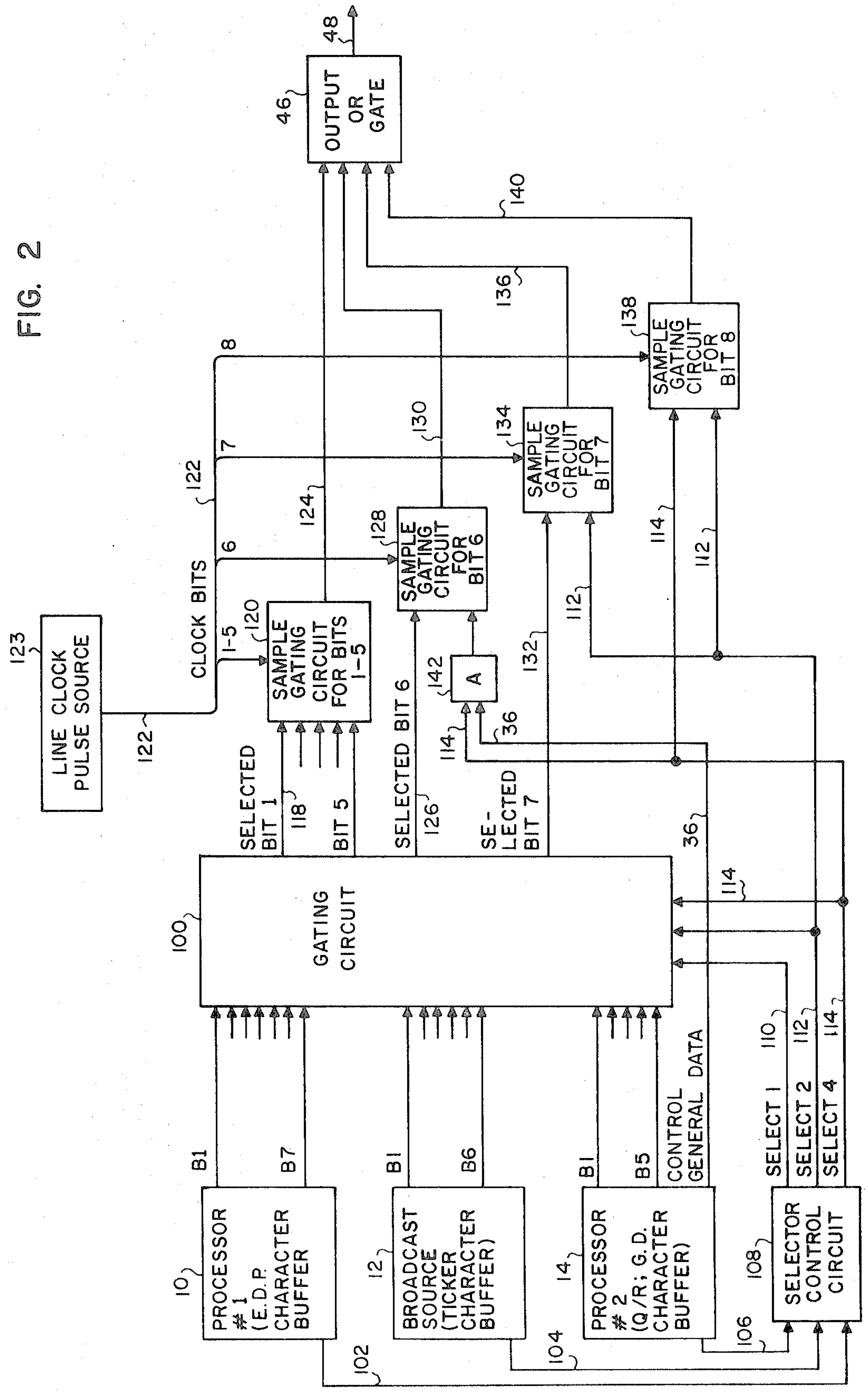
FIG. 2 is a schematic block diagram of an alternative embodiment of the central station shown in FIG. 1A.

The third and fourth positions are reserved for the transmission characters of two independent broadcast sources (identified as BR1 and BR2), such as the ticker lines for the New York and American Stock Exchange, respectively, and corresponding to the kind of source illustrated at 14 in FIG. 1A. If no broadcast characters are available for transmission, the ASCII-coded EDP characters from processor 12 are substituted, and if none of these is available, ASCII-coded synch characters are sent instead. Periodically, such as every minute or so, the third and fourth positions are filled with successive ASCII-coded synch characters to reestablish synchronization at any receiver. In the embodiment of the invention shown in FIG. 1A a separate one of the code converters 18 has been provided for each of the data sources. A separate selector-control circuit is also provided. In FIG. 2 an alternative central station configuration in accordance with the teachings of this invention is illustrated in which the functions of the code converters and the selector-control circuit are performed by a signal circuit. Referring to FIG. 2, it is seen that each of the data sources, 10, 12 and 14 has a number of bit output lines equal to the number of bits in the information characters which it generates. Thus, processor 10 has seven bit-output lines, broadcast source 12 six bit-output lines, and processor 14 five bit-output lines. These lines are connected as the inputs to gating circuit 100. Processor 10 also has a control output 102, broadcast source 12 a control output 104, and processor 14 a control output 106. A signal appears on one of the outputs when the corresponding source has an information character to transmit. The lines 102–106 are connected as inputs to selector-control circuit 108. Circuit 108 may, for example, be a ring counter, the number of stages of which corresponds to the number of data sources. As with previously described selector-control circuits, when the transmission of a character from a particular source has been completed, the counter steps to position corresponding to the next source which has information to transmit. The outputs from circuit 108 are lines 110, 112 and 114. A signal on one of these lines indicates the source which is presently transmitting.

When a signal appears online 110 from circuit 108, gating circuit 100 is conditioned to pass the seven bits from processor 10. The first five of these bits are applied in parallel through lines 118 to sample gating circuit 120. These bits are then gated out, one at a time, under control of line clock pulses on lines 122, from line clock pulses source 123 to common output line 124. The bits on line 124 pass through output OR-gate 46 to circuit output line 48. The signal on line 110 gates the sixth bit from processor 10 through line 126 to gating circuit 128. At bit six time of the line clock cycle, this bit is passed through circuit 128, line 130 and OR-gate 46 to line 48. Similarly, the seventh bit of the character is gated through circuit 100, line 132, gating circuit 134, line 136, and OR-gate 46 to output line 48. Finally, since the signal on line 100 is not applied as an input to bit eight gating circuit 138, a 0-bit appears in this bit position. It will be remembered that characters from processor 10 are identified by the 0 in the eighth-bit position. Thus, the circuit performs both the coding and selecting functions.

A signal on line 112 is similarly effective to gate the first five of the six information bits from broadcast source 12 through gating circuit 100, lines 118, gating circuit 120, and line 124 to the circuit output line. Bit six, the last information bit from this source, is also passed through gate 128 to the circuit output line. Finally, line 112 is applied as an input to gating circuits 134 and 138. Therefore, at bit-seven time, a bit is passed through line 136 to the circuit output line, while, at bit-eight time, a bit is passed through line 140 to the circuit output line. The desired coding, a one-bit in both the bit-seven and bit-eight position of the transmission character, is in this manner effected.

A signal on select line 114 causes the five information bits from processor 14 to be passed through lines 118, gates 120, and line 124 to output line 48. At bit-six time of the line clock, a signal is applied by line 114 to one input of AND-gate 142. If general data is being transmitted, processor 14 also applied a signal to control line 36 at this time, fully conditioning AND-gate 142 to apply a signal to gate 128. This signal is passed through gate 128 and line 130 to output line 48. If, on the other hand, query-response data is being transmitted at this time, there is no signal on line 36, and a 0-bit in the bit-six position of the character, character. Line 114 is effected. as one input to the gate 138, but is not connected as input to gate 134. This results in a 0-bit appearing on line 48 at bit-seven time and a 1-bit appearing on the line at bit-eight time of the transmission character. The desired coding for eight-bit transmission character derived from source 14 is in this manner achieved.

Communications systems in accordance with this invention may be used in various other types of applications, for example, in closed-loop monitoring systems, in so-called machine-to-machine applications, such as process control systems, etc. To illustrate one such different embodiment of the invention, FIG. 4 shows how this novel communication system may be employed in a medical application, specifically in the operating room of a hospital, as part of an automatic control system for maintaining certain body conditions of the patient at proper levels.

In more detail, the overall system includes a group of condition-sensing devices 200 adapted to measure specific characteristics of the patient's body status. For example, there may be an electrocardiogram pickup 202, a blood pressure detector 204, and other suitable sensors (not shown). These sensors all produce output signals which typically are in analog form. Such analog signals may be converted to digital form e.g., by a conventional analog-to-digital converter, and the digital signals may be stored temporarily in a recirculating memory serving as an intermediate data acquisition device, such as the delay line memory arrangement 59 referred to hereinabove.

Instead of providing an intermediate data acquisition means, the analog outputs of the sensors 202, 204 may be sampled periodically, by conventional gating means, and sent to respective code converters 206, 208, arranged to convert the sampled analog signals directly to corresponding digital transmission characters of the type described hereinabove with reference to converters 18. These converters would thus include not only the periodic sampling and conventional analog-to-digital converter circuits, but in addition would include means to add one or more indicator bits to each digital signal. With such means, the code converters 206, 208 are arranged to effect a one-step conversion of the analog signals to corresponding transmission characters.

The transmission characters from converters 206, 208 are directed to a selector-control circuit 210, similar to that described above with reference to FIG. 1B. The output of selector 210 is coupled to a transmission channel 50A, corresponding to channel 50 of FIG. 1B, leading to a central station of the type shown in FIG. 1A. This station includes analyzers 86 and 88 arranged to sort out the incoming transmission characters in accordance with their original source, i.e., so that all transmission characters from any particular source 202 or 204 are associated together in proper sequence, and segregated from all other transmission characters.

The central station also includes a general purpose computer (such as processors 12 and 16) of known type and organization, having a stored program and arranged to operate in time-shared fashion to process in a predetermined sequence the data signals from the respective sources 202, 204. From this processing are evolved corresponding control signals representing calculated control action to be taken with respect to the patient's condition. These control signals are in digital form and are converted (by code converters 18) to transmission characters having one or more indicator bits which serve to identify the intended receiver unit. (Note that in a complex medical monitoring and supervisory control system, there will not necessarily be control signal individual to each data source 202, 204; that is, some or all control signals may reflect the influences of numerous input signals.)

The transmission characters produced by the central station processor are sent out on a return line 48A in an interleaved fashion. The nature of such interleaving, e.g., the ratio of numbers of characters for one receiver to the characters for another receiver, will be determined by the processor program in accordance with medical and/or other technical requirements. That is, certain types of control signals may have to be sent more often than others, due to the critical character of the medical function being supervised by the particular intended receiver.

These transmission characters are directed to a group of analyzers 218, 220, etc., each of which, as previously discussed, picks out all transmission characters intended for a corresponding receiving unit 222, 224, etc. Each receiving unit includes conventional circuitry suitable for utilizing the incoming control signals to operate a corresponding actuator. For example, one group of control signals may be used to adjust the opening of a valve 226 in a conduit leading to an intravenous feeding insert in the patient's body; another group of control signals may operate another valve 228 influencing the amount of anesthetic the patient receives, and so forth. By such means, the patient's functioning can be maintained automatically at proper levels for optimum life-support during an operation.

The processor at the central station may if desired perform many other tasks. For example, it may produce signals representing the actual or corrected values of measurements made by sensing devices at the patient. Such signals, converted to transmission characters as previously described, can be isolated at the operating room station by corresponding analyzers 230, 232 are used to control CRT (or other) display devices 234, 236 which present graphic or appropriate pictorial displays to indicate to the operating room personnel the status of the particular measured conditions.

Query-reply service also may be furnished directly to the operating room personnel, to aid in solving specialized problems that might arise in carrying out surgical or other procedures. This feature is illustrated by the provision of a CRT/keyboard unit 54A the output code characters of which are directed to a code converter 80A arranged to produce corresponding transmission characters as described hereinabove. These transmission characters are coupled to outgoing line 50A by selector control circuit 210 and are thereby directed to the central processor which develops reply message signals responsive to the particular query. These reply messages, converted to transmission characters, are sent over line 48A where they are detected by an analyzer 62A. The information bits of the detected characters are sent on to the CRT/keyboard unit to control the CRT display so as to present the desired information to the operating room personnel.

The system of FIG. 4 may of course include additional operating stations connected to the central processor by the same communication lines 48A an 50A using suitable communications controls as described above for regimenting the flow of transmission characters.

While selector-control circuits 40, 108, etc., described above had been considered to be counters which step to the next circuit or device which has a character to transmit after each transmission, the selector circuits may include logic to permit special functions to be carried out such as weighted selection. That is, a selector-control circuit may be caused to "visit" one of the information generating devices more often than other devices where the data rate for that device is considerably higher than for the others. This weighting function can be achieved by having the circuit counters skip one or more counter stages during certain cycles, such as every other cycle. By such techniques, the selector-control circuit may interleave the characters in a preselected ration such as, in the embodiment of the invention shown in FIG. 1A, three characters from EDP source 12 for every one character from broadcast source 14.

Another possible modification would be to provide the selector-control circuit with a look ahead facility whereby, during transmission of characters from one source, the circuit checks other inputs to see whether there is a character awaiting transmission. If there is a waiting character, this character is coupled to the outgoing channel at the end of the character then being sent; if there is no waiting character the selected control continues sending characters from the original source without interruption. More sophisticated look-ahead operations are possible if a number of buffers are supplied in the embodiment of the invention shown in FIG. 1, or if additional control information is supplied in the embodiment of the inventions shown in FIG. 2. Under these conditions, a queue of information can be accumulated from a given source and the selection operation made responsive to traffic conditions at any given instant. Priority may also be assigned to transmissions from a particular source. Thus, the circuit might look to see if there is any message from an emergency source and put this message out on the line regardless of traffic waiting to be transmitted from other sources. Another possible modification would be for the selector to contain comparison circuitry which would permit it to compare present transmissions with previous transmissions and pass a message to the line only if a change is detected. Such an arrangement would, for example, permit more efficient utilization of the lines in a monitoring application such as that shown in FIG. 4.

In the discussion above, it was assumed that the transmission of information was on a character-by-character basis and therefore it was necessary to apply a class identification to each character. However, in some systems, bulk transfer of information may be preferred. Thus, once a particular source gains access to the line, it may transmit an entire message before relinquishing the line to another source. With such bulk transfer, it may not be desirable to include the identification bits with each character. While such a mode of operation differs in many ways in concept from that of the system described above, the system could be modified to accept at the beginning of each message a character containing an identification code or a special control character. This character would be recognized at the receiving station to activate appropriate transfer circuitry. This circuitry would remain set until an end of message indication was received. Similar operation would occur with, for example, high priority traffic where the regular character structure might be contracted in order to increase the transmission efficiency. When a desired class of traffic is given access to the line for an extended period of time there may be a transmission of "packed numerics" which are pure decimal digits with four bits per character. Thus each transmission character might contain two such coded characters as a single information unit identified as indicated above.

In the discussion so far it has also been assumed that the transmitter and receiver are at separate locations and are interconnected by a transmission line. However, similar problems arise in, for example, an airliner where cable harnesses are required to interconnect controls at one end of the aircraft with responsive devices at the other end. These cable harnesses are expensive and add substantially to the weight of the aircraft. By utilizing the teachings of this invention, a small number of lines, or perhaps even a single line, could be substituted for the cable harness.

It is of course apparent that the particular code structure utilized for the illustrative embodiment of the invention is not critical and that other codes could be utilized. For example, data source 12 could be identified by a 1 bit in the eighth-bit position of the transmission character and information from source 14 by 0 bits in the seventh and eighth-bit positions. Other code combinations would suggest themselves to those skilled in the art.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A system for handling characters of coded signal information representing different classes of data comprising;
   code-converting means adapted to receive said characters of signal information and to generate therefrom transmission characters having a uniform structure, said converting means including means for utilizing said signal information to form a portion of each transmission character, and means responsive to the class of the data for applying a unique identifying code as the remaining portion of said transmission character;
   a single transmission channel; and
   means for applying the outputs from said code-converting means to said transmission channel.

2. A system of the type described in claim 1 wherein said transmission characters are the same length for all classes of data, said length being a number of bits (L) which is at least on greater than the number of bits in the longest characters to be handled by said system;
   wherein there are M-bits in each character of said coded signal information, where M may vary with the class of data; and
   wherein each transmission character includes M-bits which are identical to the M-bits of the corresponding coded signal information character and (L–M) bits which are coded identification for the class of data.

3. A system of the type described in claim 2 wherein each bit of the coded data class identification of the transmission character is utilized to indicate whether an adjacent bit is another identification bit or a data bit.

4. A system of the type described in claim 1 wherein said classes of data are derived from a plurality of different sources; and
   wherein said code-converting means includes a number of buffers which is at least equal to the number of said sources, means for storing a character of signal information from a given one of said sources in selected bit positions of the corresponding buffer, and means for storing a class identifying code for the class of data from said source in the remaining bit positions of said buffer.

5. A system of the type described in claim 1 wherein said outputs applying means includes means for selecting the class of data which is to be applied from said converting means to said transmission channel at any given time.

6. A system of the type described in claim 1 including a plurality of information receiving means; and
   means responsive to the class of each transmission character on said transmission channel for directing the transmission character to an appropriate receiving means.

7. A system of the type described in claim 6 wherein each of said receiving means has associated therewith a means for analyzing the identifying code portion of each transmission character; and wherein said analyzing means operates in response to the detection of the identifying code for the class of data which the associated receiving means is adapted to receive for passing the character received on said transmission channel to said receiving means.

8. A system of the type described in claim 2 including means for selecting the class of the data which is to be passed from said converting means to said transmission channel at any given time; and wherein said code-converting means includes first means operative in response to said class selecting means for passing the M-bits of applied signal information of the selected class to said transmission channel, and second means responsive to said selecting means for applying identification bits for the selected class of data to said transmission channel at the appropriate bit positions of each transmission character.

9. A system of the type described in claim 1 wherein the signal information for at least some of said data classes have different code structures, including differing numbers of bits-per-character.

10. A device for converting multibit coded characters representing different classes of data into uniform transmission characters comprising;

means for establishing a uniform bit length for sad transmission characters which length is a number of bits which is at least one bit greater than the number of bits in the longest of said coded characters;

means for utilizing the bits of each coded character to form a predetermined portion of the corresponding transmission character; and means responsive to the class of said data for generating a selected bit code which is utilized to form the remaining portion of said transmission character.

11. A system for handling characters of coded signal information representing different classes of data comprising;

means for converting said characters of signal information into transmission characters having a code structure which is, at least in part, dependent on the class of the data;

a single transmission channel;

means for selecting the class of data which is to be passed from said converting means to said transmission channel at any given time;

a plurality of information received means; and means responsive to the class of the transmission character on said channel for directing the transmission character to an appropriate receiving means.

12. In a communication system wherein one transmission channel serves to carry signals representing coded information units of at channel, comprising two different classes;

the method of distinguishing different signals to permit identifying the class thereof at a receiving station coupled to said channel, comprising the steps of:

converting the information units to corresponding transmission characters of structure different from the structure of said information units and capable of conveying more intelligence than the corresponding information unit;

controlling at least one predetermined intelligence element of each transmission character in accordance with the class of the corresponding information unit.

13. The method of claim 12, including the step of selecting the class of information units which is to be carried on said transmission channel at any given time.

14. The method of claim 12 including the step of initially forming the information units of said different classes with different code structures.

15. The method of claim 14, wherein the information units are converted to transmission characters of uniform structure.

16. In a data handling system wherein one transmission channel serves to carry data representing original signals of at least two different classes;

apparatus for developing transmittable signals adapted to be distinguished in such a way as to permit identifying the class thereof at a receiving station coupled to said channel, said apparatus comprising:

means for converting the original signals to corresponding transmission characters of a structure capable of conveying more intelligence than is present in the corresponding original signal; and means for controlling at least one predetermined intelligence element of each transmission character in accordance with the class of the corresponding original signal.

* * * * *